United States Patent
Feng et al.

(10) Patent No.: US 11,107,103 B2
(45) Date of Patent: Aug. 31, 2021

(54) MULTI-CARD OVERLAY DISPLAY

(71) Applicant: Advanced New Technologies Co., Ltd., Grand Cayman (KY)

(72) Inventors: Zhiyuan Feng, Hangzhou (CN); Yanpeng Li, Hangzhou (CN); Long Cheng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/714,351

(22) Filed: Dec. 13, 2019

(65) Prior Publication Data

US 2020/0364732 A1 Nov. 19, 2020

Related U.S. Application Data

(63) Continuation of application No. PCT/CN2019/086842, filed on May 14, 2019.

(51) Int. Cl.
*G06Q 30/02* (2012.01)
*G06F 3/0484* (2013.01)

(52) U.S. Cl.
CPC ..... *G06Q 30/0207* (2013.01); *G06F 3/04845* (2013.01); *G06F 3/04847* (2013.01)

(58) Field of Classification Search
CPC ............ G06Q 30/0207; G06F 3/04845; G06F 3/04847
See application file for complete search history.

(56) References Cited

U.S. PATENT DOCUMENTS

2007/0073758 A1* 3/2007 Perry ................. G06Q 30/0633
2013/0185642 A1* 7/2013 Gammons ............ G06F 3/0482
715/733

(Continued)

FOREIGN PATENT DOCUMENTS

CN 106530006 3/2017
CN 108734513 11/2018

(Continued)

OTHER PUBLICATIONS

Gotchev et al., "Three-Dimensional Media for Mobile Devices" (published in Proceedings of the IEEE, vol. 99, Issue: 4, pp. 708-741, Apr. 1, 2011) (Year: 2011).*

(Continued)

*Primary Examiner* — James M Detweiler
*Assistant Examiner* — Patrick Kim
(74) *Attorney, Agent, or Firm* — Fish & Richardson P.C.

(57) ABSTRACT

A method includes identifying data encoding coupons, each coupon associated with a sponsoring manufacturer and associated with an event organized by the manufacturer; grouping the coupons into arrays of matching coupons for each sponsoring manufacturer and each associated event; and dynamically displaying, on the user interface, an array of matching coupons associated with a particular event organized by a particular sponsoring manufacturer, wherein dynamically displaying comprises: arranging the coupons of the array from a first end to a second end on the user interface such that each pair of neighboring coupons form an overlap and each coupon, other than a currently active coupon, is partially visible; and in response to a user input on the user interface, changing the currently active coupon such that a new coupon becomes the currently active coupon while other coupons are partially visible by virtue of the overlap formed by each pair of neighboring coupons.

26 Claims, 10 Drawing Sheets

(56) References Cited

U.S. PATENT DOCUMENTS

| | | | | |
|---|---|---|---|---|
| 2013/0204704 | A1* | 8/2013 | Ross | G06Q 30/0211 |
| | | | | 705/14.57 |
| 2014/0149198 | A1* | 5/2014 | Kim | G06Q 30/0226 |
| | | | | 705/14.27 |
| 2015/0302396 | A1* | 10/2015 | Jeon | G06Q 20/36 |
| | | | | 705/41 |
| 2015/0348169 | A1* | 12/2015 | Harris | G06Q 30/0633 |
| | | | | 705/26.8 |
| 2016/0225008 | A1 | 8/2016 | Song et al. | |
| 2017/0278127 | A1 | 9/2017 | Smrzlix et al. | |
| 2017/0364936 | A1 | 12/2017 | Balfour et al. | |

FOREIGN PATENT DOCUMENTS

| | | |
|---|---|---|
| GN | 103168287 | 12/2016 |
| TW | 201606746 | 2/2016 |

OTHER PUBLICATIONS

Crosby et al., "BlockChain Technology: Beyond Bitcoin," Sutardja Center for Entrepreneurship & Technology Technica Report, Oct. 16, 2015, 35 pages.

Github.com [online], "WebGazerjs: Scalable Webcam EyeTracking Using User Interactions" 2019, retrieved on Feb. 19, 2020, retrieved from URL <https://github.com/brownhci/WebGazer>, 3 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/086842, dated Feb. 17, 2020, 7 pages.

Dummies.com [online], "How to Use Flip and Flip 3D in Windows 7," available on or before Dec. 18, 2016, via Internet Archive: Wayback Machine URL<https://web.archive.org/web/20161218143025/https://www.dummies.com/computers/operating-systems/windows-7/how-to-use-flip-and-flip-3d-in-windows-7/>, 3 pages.

FerX, "[Wii] Just Dance 4 Song list + DLC," Mar. 22, 2017, retrieved on Dec. 15, 2020, <https://www.youtube.com/watch?v=Y1guSn0S53c>, 3 pages [Video Submission].

Sanjiv Creation, "How to Using Aero Flip 3D in Windows 7," Feb. 8, 2016, retrieved on Dec. 15, 2020, <https://www.youtube.com/watch?v=oGG6VGGh9Mw>, 3 pages [Video Submission].

TechTutorialVideo, "Windows 7 Aero Peek," Apr. 19, 2012, retrieved on Dec. 15, 2020, <https://www.youtube.com/watch?v=xubD5naBWhY>, 3 pages [Video Submission].

* cited by examiner

FIG. 4A

411 — Event 1 / Total ¥493 / Valid Unit 20180716

| ¥1 X3 | ¥2 X3 | ¥6 X9 | ¥18 X3 | ¥188 X2 Total ¥396 |

412A — Valid Unit 20180716 / Explanatory Description / Event 2 Total ¥516

| ¥ X3 | ¥ X3 | ¥6 X9 | | |

412B —

| ¥1 X3 | ¥3 X3 | ¥6 X9 Total Y54 | ¥18 X3 | ¥188 X2 | Event 2 Total ¥516 |

MULTI-CARD OVERLAY DISPLAY

CROSS-REFERENCE TO RELATED APPLICATIONS

This application is a continuation of PCT Application No. PCT/CN2019/086842, filed on May 14, 2019, which is hereby incorporated by reference in its entirety.

TECHNICAL FIELD

This specification relates to a graphic user interface (GUI) for displaying information.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Blockchain implementations of coupons can be displayed via a variety of user programs on a user device, such as a smartphone device. The user programs can include a web browser, an APP, a mini-program. For example, a web browser, which is often referred to as a browser, is an application for retrieving and displaying web information resources. An APP refers to an application, which can be a third-party application of a smartphone device. A mini-program can be an application that can be loaded and used by the specified mobile APP without downloading and installing.

It would be desirable to display blockchain coupon information in a more efficient and more user-friendly manner via a user program on a user device, such as a smartphone device.

SUMMARY

This specification describes technologies for static and dynamic displays of blockchain coupons to facilitate a small business owner (e.g., a grocery store owner) to inspect and redeem each types of coupons in a more user friendly way. These technologies generally involve projecting the blockchain coupons in a multi-dimensional manner according to types of promotion events, types of coupons, number of coupons for each type, etc. These technologies also involve displaying the packed coupons dynamically in response to user inputs such that the current active coupon is changed accordingly to adapt to user expectation, thereby improving user experience when scrolling through a large set of coupons from disparate sources.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

FIGS. 4A and 4B illustrate examples of the environment on a user device for displaying the blockchain coupons statically.

Like reference numbers and designations in the various drawings indicate like elements.

DETAILED DESCRIPTION

Figure 1:
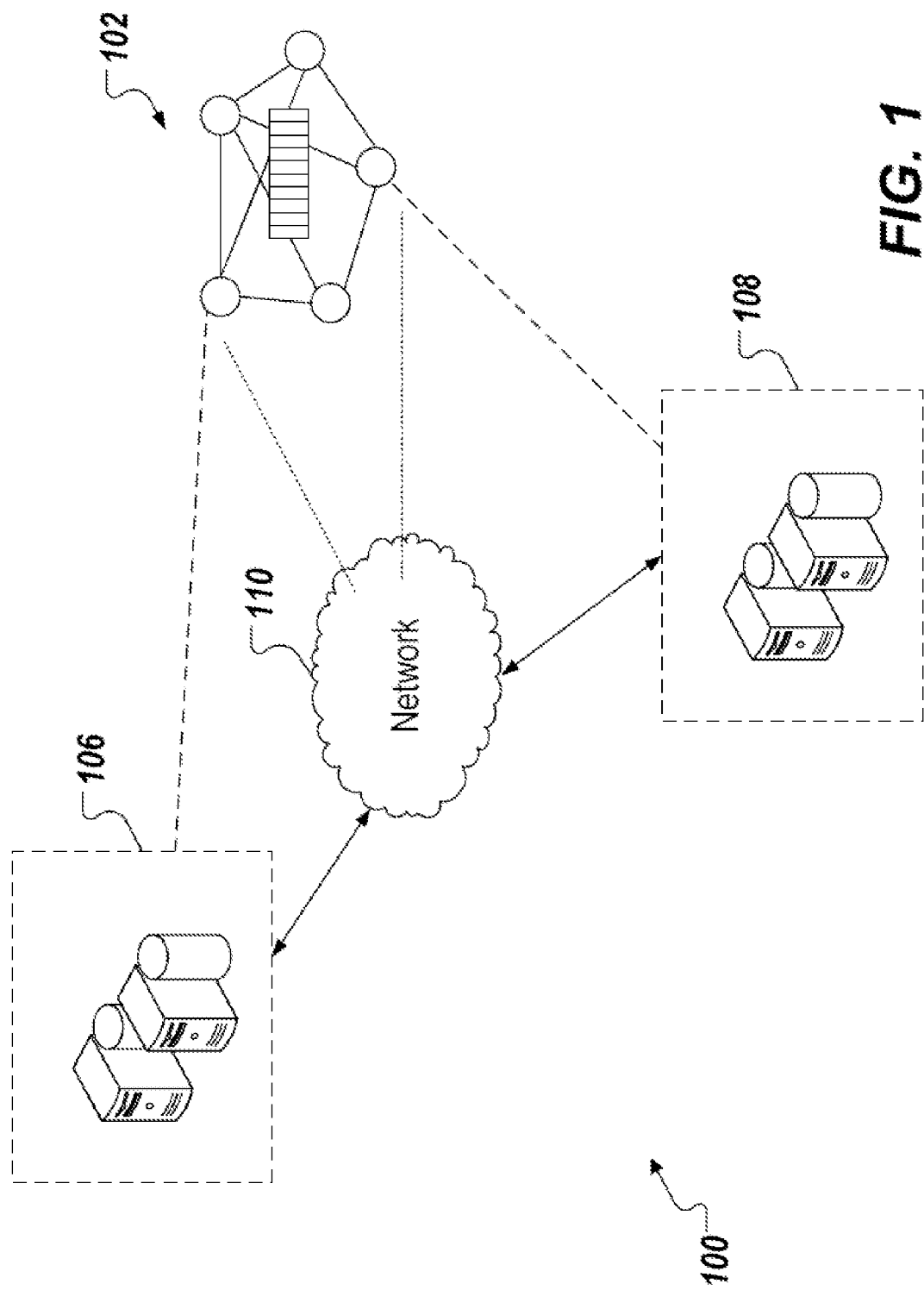
FIG. 1 is a diagram illustrating an example of an environment that can be used to execute embodiments of this specification.

This specification describes technical improvements to a display on a user device that leverages blockchain traceability of redeemable items, such as coupons. As an illustration, small merchants may collect coupons, implemented in blockchain technology, from patrons. The coupons may be associated with different manufacturers, and each may sponsor varying promotional events to market their products. For redemption purposes, coupons associated with different promotional events may have different expiration dates and varying denominations. Automatic forwarding of the coupons to the manufacturers may not be feasible for the small merchants. Instead, a small merchant may prefer batch processing of the coupons associated with the promotional events organized by varying manufacturers. This batch processing may be performed on, for example, a smartphone device.

This specification describes techniques that can improve the user interface so that a user, for example, an owner of a grocery store, can inspect coupons of varying denominations associated with, for example, a particular promotional event organized by a particular manufacturer. These coupons may be arranged in a multidimensional manner on the user interface. The coupons may additionally be arranged in the display to achieve an overlap between neighboring pairs. In this manner, a currently active coupon is visible while all other coupons are partially visible. Thus, more coupons may be arranged on the display in a more space efficient manner. In response to user inputs, the user interface may adjust the coupons on the display so that the currently active coupon moves according to the user's expectation during the review process. The user may traverse, track, and redeem the coupons associated with a promotional event organized by a particular manufacturer. These described techniques can demonstrate an improved user interface that can lead to an improved user experience.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
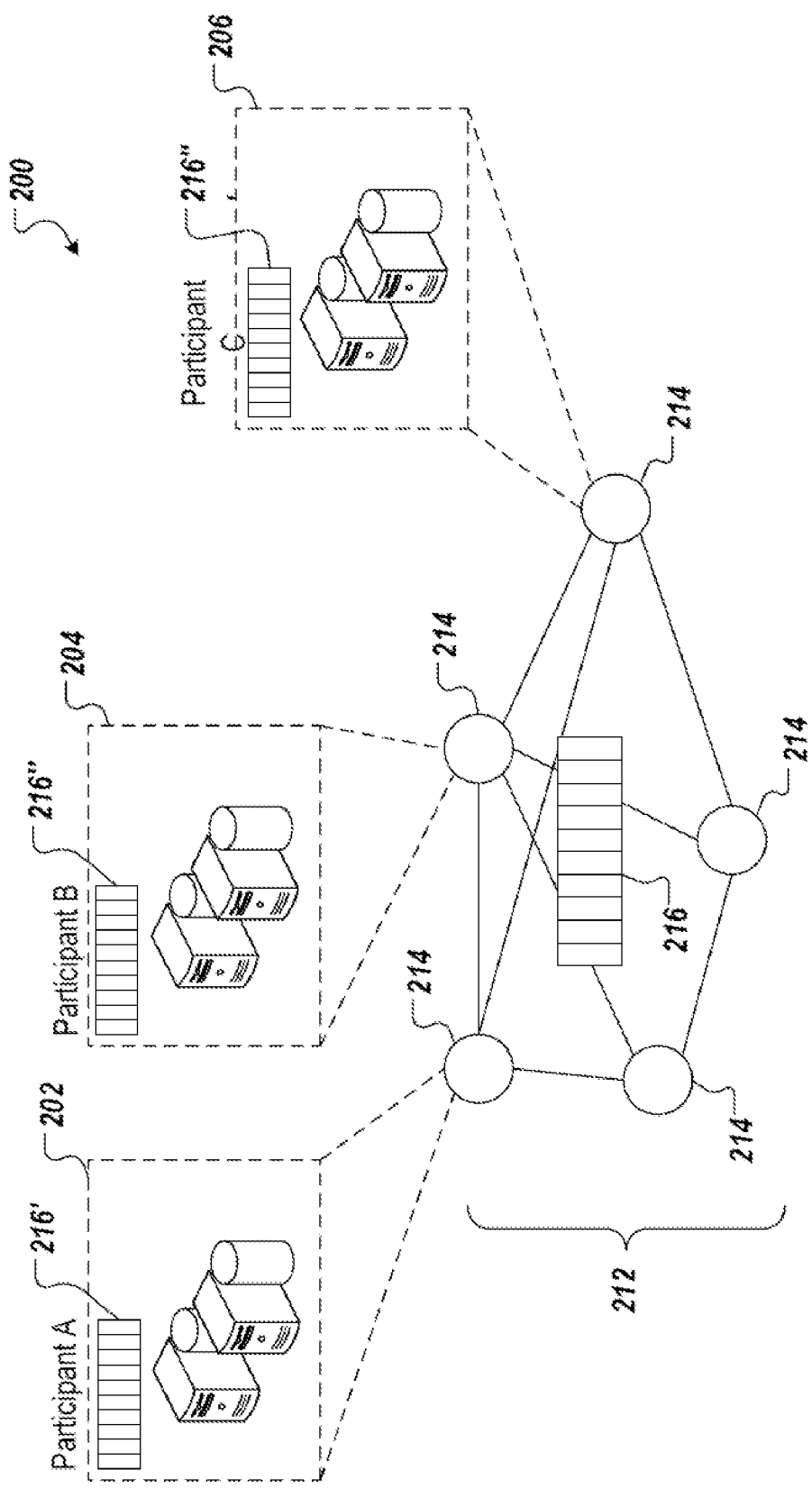
FIG. 2 is a diagram illustrating an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as minder nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204 store respective, complete copies 216', 216" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In this context of a blockchain implementation, coupons may be issued by manufacturers and then used by customers who patronize a store, such as a grocery store, a convenience store, a pharmacy store, etc. The coupons can be issued by leveraging the blockchain technology as described above and outlined in FIGS. 1-2. The coupons may be collected electronically by the store. The store recipient can inspect, compare, tally, and redeem these coupons. This specification describes techniques that can improve a user interface to facilitate a user (e.g., a grocery store owner) to navigate, review, and redeem each types of coupons in a more efficient way.

Figure 3:
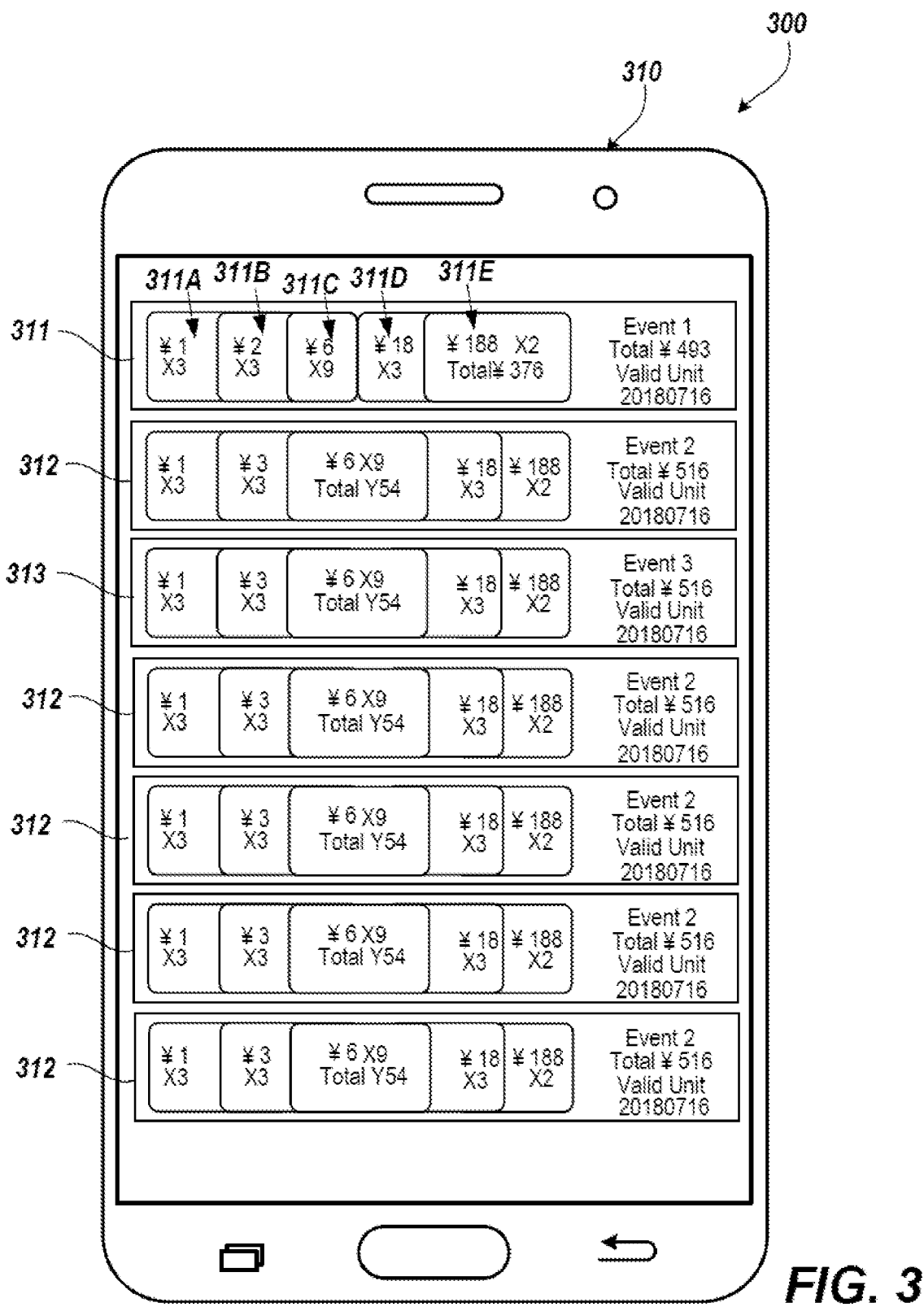
FIG. 3 illustrates an example of an environment on a user device to display a multitude of blockchain coupons in a multidimensional manner.

FIG. 3 illustrates an example of an environment on a user device to display blockchain coupons. In the environment 300, coupons associated with multiple events are presented in different rows (or arrays) on the display 310 of a smartphone device. The presentation may also be on other types of devices, such as on a desktop computer or laptop computer in a browser program. As shown, the coupons are arranged into different rows (or arrays) corresponding to each event. For example, row 311 corresponds to event 1; row 312 corresponds to event 2; and row 313 corresponds to event 3. Within each row, the coupons may be grouped according to, for example, monetary value (or denomination value). For example, within row 311, position 311A is packed with three coupons issued by the manufacturer and used by consumers patronizing the store. The three coupons are each valued at 1. Yuan. In this example, the three coupons are coalesced as one entry for the purpose of the display to render a more efficient presentation that packs more information per unit space. Position 311B is packed with three coupons, each valued at 2. Yuan. Position 311C is packed with nine coupons, each valued at six yuan. Position 311D is packed with three coupons, each valued at eighteen Yuan. Summary information of the total value for coupons associated with event 1 is available at position 311E, along with the expiration date of this event. Rows 312 and 313 are similarly presented. Here, an event can be a promotional event organized by a particular manufacturer. The coupons may also be referred to as vouchers. Such coupons may correspond to an event may have a common expiration date. In some implementations, the coupons correspond to an event may have a common initial offering date: when the coupons were issued by the organizing manufacturer. As shown, the rightmost portion of row 311 contains descriptive information summarizing event 1. Such description information can include: number of coupons in total, and total value of the coupons. Notably, row 312 for event 2 and row 313 for event 3 are similarly arranged. For example, coupons for each event may be grouped into various positions, each corresponding to a denomination value (or other attributes). In this manner, the voluminous coupons may be projected on the display device 310 in a multi-row presentation.

This specification describes examples of user interface configurations that are technically advantageous for a number of reasons. As a user interface, the configurations allow for individual operations on coupons of a specified denomination. The examples also allow the user to perform batch operations on coupons according to a given dimension of a particular event. Additionally, the examples allow the user to operate on all events globally.

FIGS. 4A and 4B illustrate examples of the environment on a user device for displaying the blockchain coupons statically. In FIG. 4A, each position in row 411 (corresponding to event 1) is associated with a particular Internet Protocol (IP) address in row 411A. A corresponding IP address in row 411A may indicate, for example, the address from which the coupons of a particular denomination were received (or the address to which the coupons are intended). In FIG. 4B, rows 412A and 412B respectively show a display configuration for coupons that are associated with event 2. In row 412A, the coupons, shown as a sliding deck, are lumped according to the denomination values and further arranged in an ascending order from left to right. The order may set forth one of: a monetary value, or a date. The right-most position contains descriptive summary information about collected coupons under event 2. Such information include, for example, expiration date and sum value. In row 412A, the currently active position is the right-most position. In comparison, the currently active position in row 412B is the position for the 9 coupons each with a denomination value of 6 Yuan. For context, the currently active position is the focus of the display device: when the user clicks at the position, the corresponding coupons may unpack to generate a more detailed view of all coupons with that denomination value. In response to such user input, the coupons at the currently active position may also be redeemed. As illustrated, the lumped coupons at the currently active position are fully visible. In contrast, those out of focus are not fully visible.

This specification discloses a variety of triggering methods that allow different coupons (or event cards) to be displayed at the top: the currently active position. These triggering methods may operate to update a display on an interactive user interface, such as the touch screen of a smartphone device. The interactive user interface may accommodate a click operation such as a touch screen click, a mouse cursor click. In response to the click operation, the clicked coupon (or card) is displayed at the top as the currently active coupon. The transition resulting from the click operation may be animated to highlight the transitive motion to place the currently active coupon on top (i.e., fully visible). The interactive user interface may also accommodate a slide operation which may be performed by sliding the screen on the touch screen of a smartphone device or sliding the mouse cursor to render a different coupon (or coupons) to be displayed. The transition to the different coupon(s) may be animated during the sliding process. When the slide is a horizontal slide, a different coupon in the same row may be displayed as the currently active coupon. When the slide is a vertical slide, the event list page will be scrolled up or down. The following figures further illustrate the dynamic strategy of coupon switching.

Figures 5A, 5B:
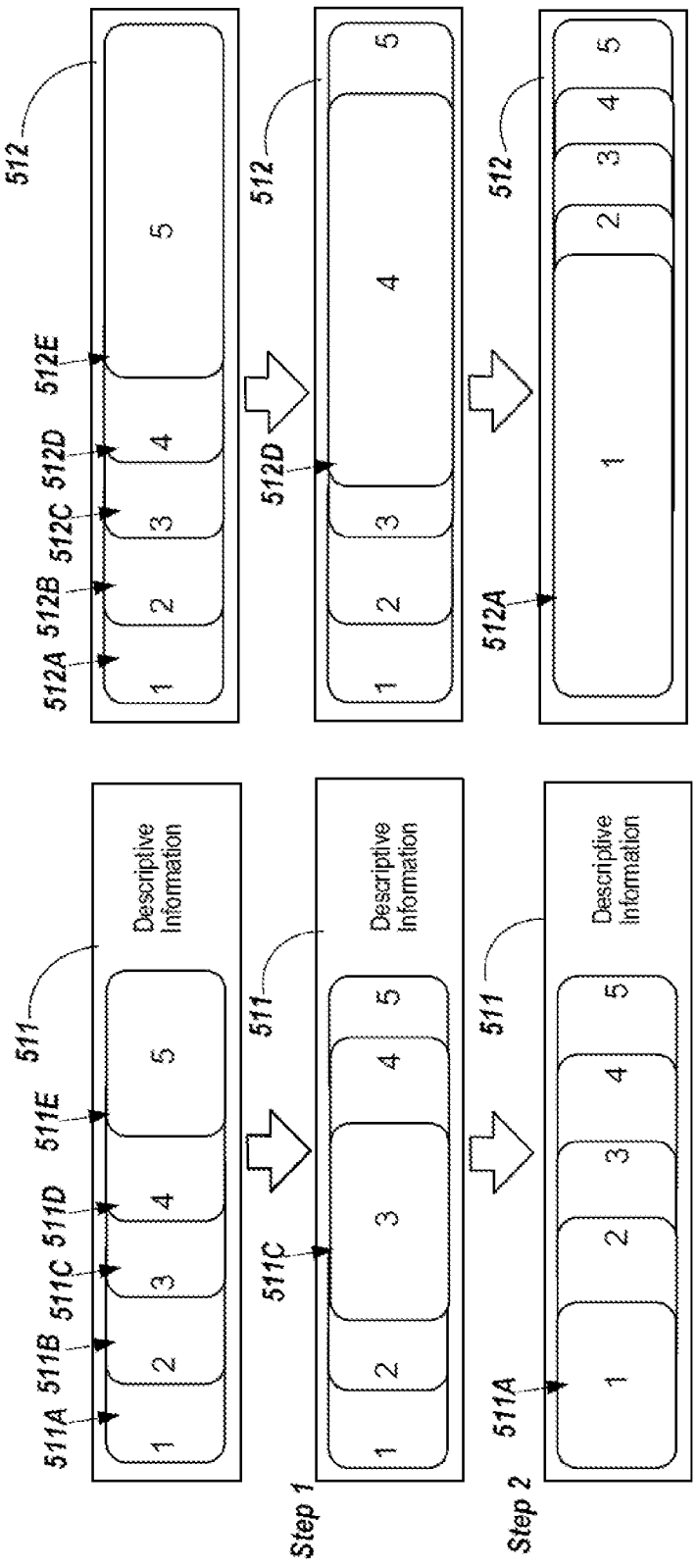
FIGS. 5A and 5B illustrate examples of the environment on a user device for displaying the blockchain coupons dynamically to include a currently active blockchain coupon.

FIGS. 5A and 5B illustrate examples of the environment on a user device for displaying the blockchain coupons dynamically to include a currently active blockchain coupon. As illustrated in FIG. 5A, the blockchain coupons are displayed in a row 511 with descriptive summary information at the right-most position. Here, a click operation, once initiated on a particular blockchain coupon position (such as 511A to 511E), can trigger that clicked blockchain coupon(s) to be displayed in full detail. For example, at step 1, a sliding motion leftward causes blockchain coupons at position 511C to be fully visible. An additional sliding motion at step 2 can lead blockchain coupons at position 511A to be fully visible. In FIG. 5A, a click motion applied on the right-most position may trigger the details page to be fully displayed. As illustrated in FIG. 5B, the blockchain coupons are displayed in row 512 without descriptive summary information at the right-most position. Here, a sliding motion at step 1 causes the particular blockchain coupon at position 512D to be fully visible. From this point on, an additional sliding motion can trigger the blockchain coupons at position 512A to be fully visible.

Figure 6A:
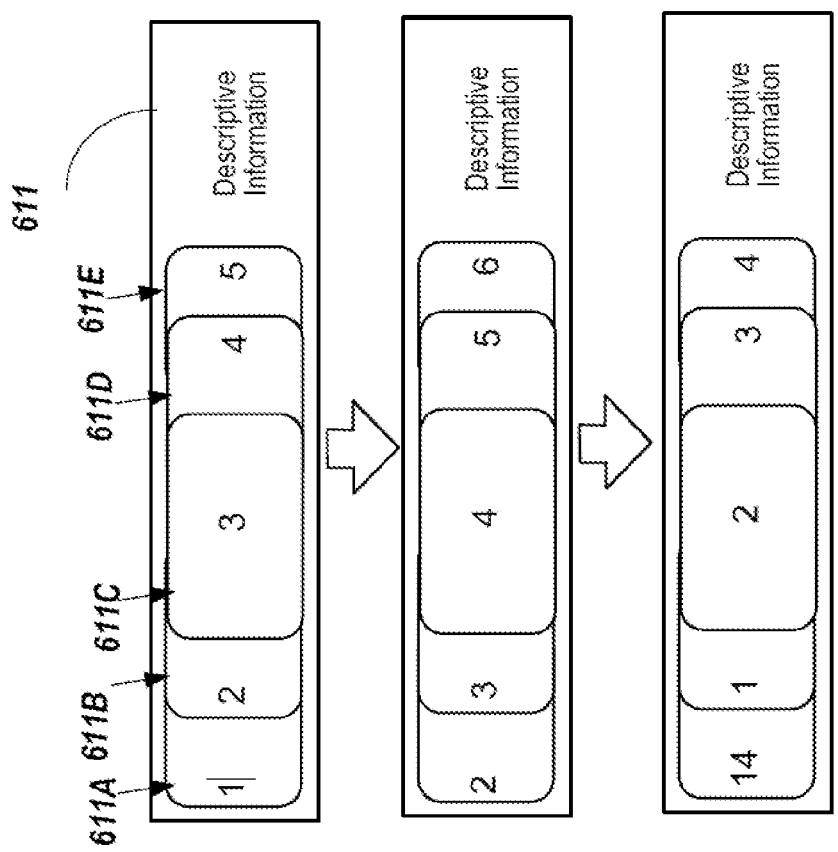
FIGS. 6A and 6B illustrate examples of the environment on a user device for displaying the blockchain coupons dynamically when the blockchain coupons are arranged as a circular or linear list.
Figure 6B:
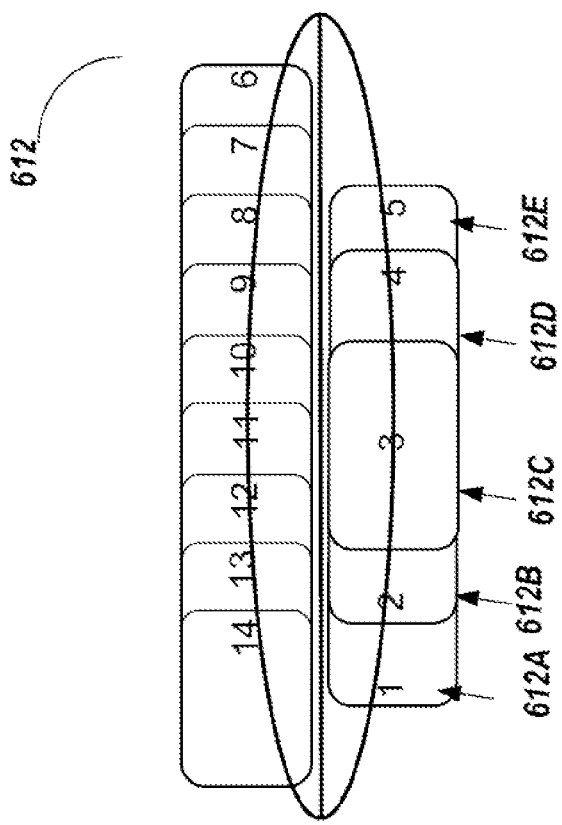

FIGS. 6A and 6B illustrate examples of the environment on a user device for displaying the blockchain coupons dynamically when the blockchain coupons are arranged as a circular or linear list. Here, the number of blockchain coupons visible at the user interface are smaller than the total number of blockchain coupons. The rest are hidden behind. In FIG. 6A, initially, blockchain coupons 1 to 5 are respectively displayed at positions 611A to 611E in row 611. The currently active blockchain coupon is coupon 3. In response to one sliding operation to the left, blockchain coupons 2 to 6 are now respectively displayed at positions 611A to 611E in row 611. Here, coupon 4 becomes the currently active blockchain coupon. The same interactive configuration applies to sliding operations to the right. As illustrated, sliding motions to the right can cause coupons 14, 1, 2, 3, and 4 to be respectively displayed at positions 611A to 611E in row 611. In this illustration, the fourteen blockchain coupons are arranged in a circular list without a head or tail to facilitate full rotations of the listing. In comparison, FIG. 6B illustrates another configuration of a linear list with a head and a tail such that when the positions 612A to 612E meet either the head or the tail, the positions are locked. For example, when position 612A is aligned with blockchain coupon 14, which is the tail position on the left, the sliding stops and the listing of displayed coupons can no longer move further to the left. The sliding operations, however, may remain functional to the right.

Figure 7:
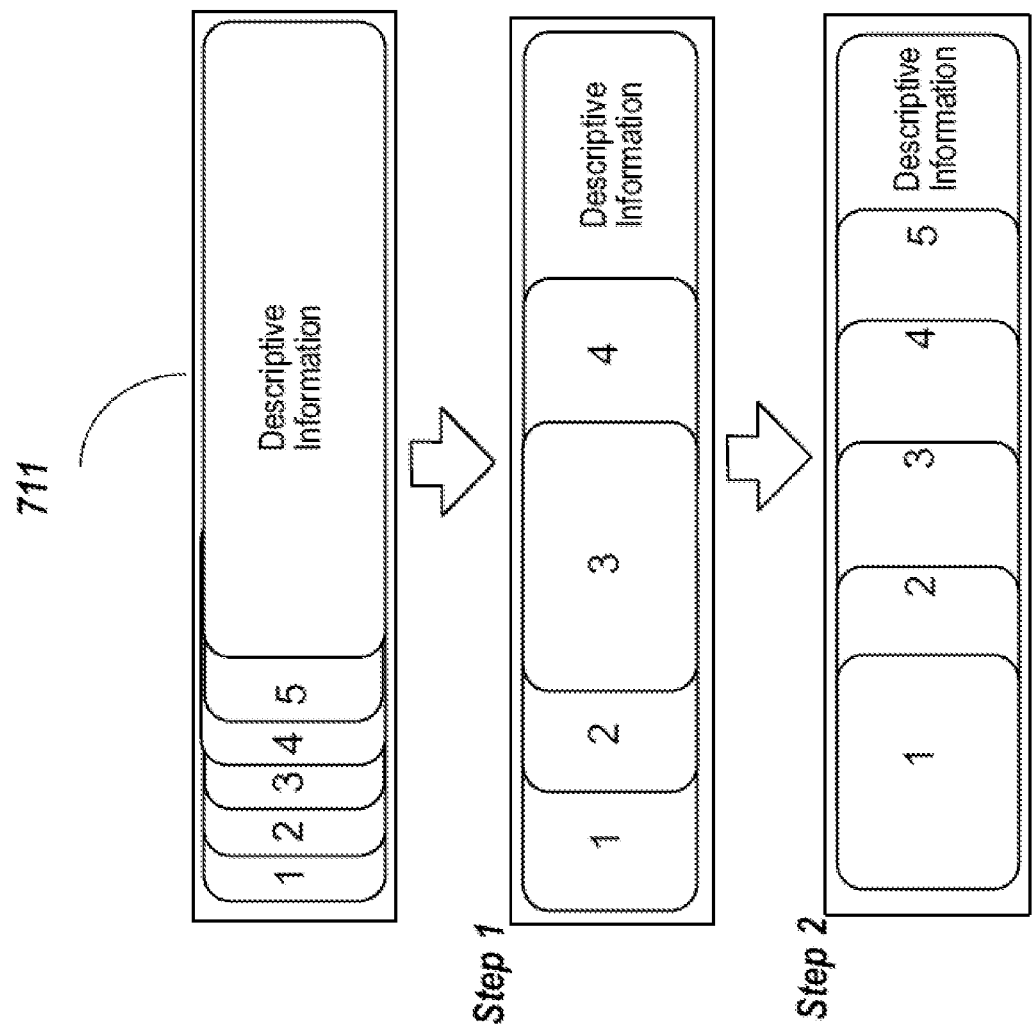
FIG. 7 illustrates an example of the environment on a user device for displaying the blockchain coupons dynamically for a user to traverse the blockchain coupons.

FIG. 7 illustrates an example of the environment on a user device for displaying the blockchain coupons dynamically for a user to traverse the blockchain coupons. Here, the event information may be displayed as a long card in row 711 such that when the event card is clicked, more detailed event information may be displayed. The event card may be displayed with on the right (as illustrated) or on the left. As illustrated, the long card is located on the right of row 711. The compact slide deck on the left may render individual blockchain coupons hard to discern. In FIG. 7, during step 1, in response to a click operation on the deck of coupons, the middle one, which correspond to blockchain coupon 3, is displayed. By this time, each blockchain coupon may have sufficiently exposed area for each one to be discerned by a user. During step 2, in response to a click operation on blockchain coupon 1, this blockchain coupon becomes the currently active coupon for display. Additionally or alternatively, a sliding operation may drive different blockchain coupons to be displayed.

Figure 8:
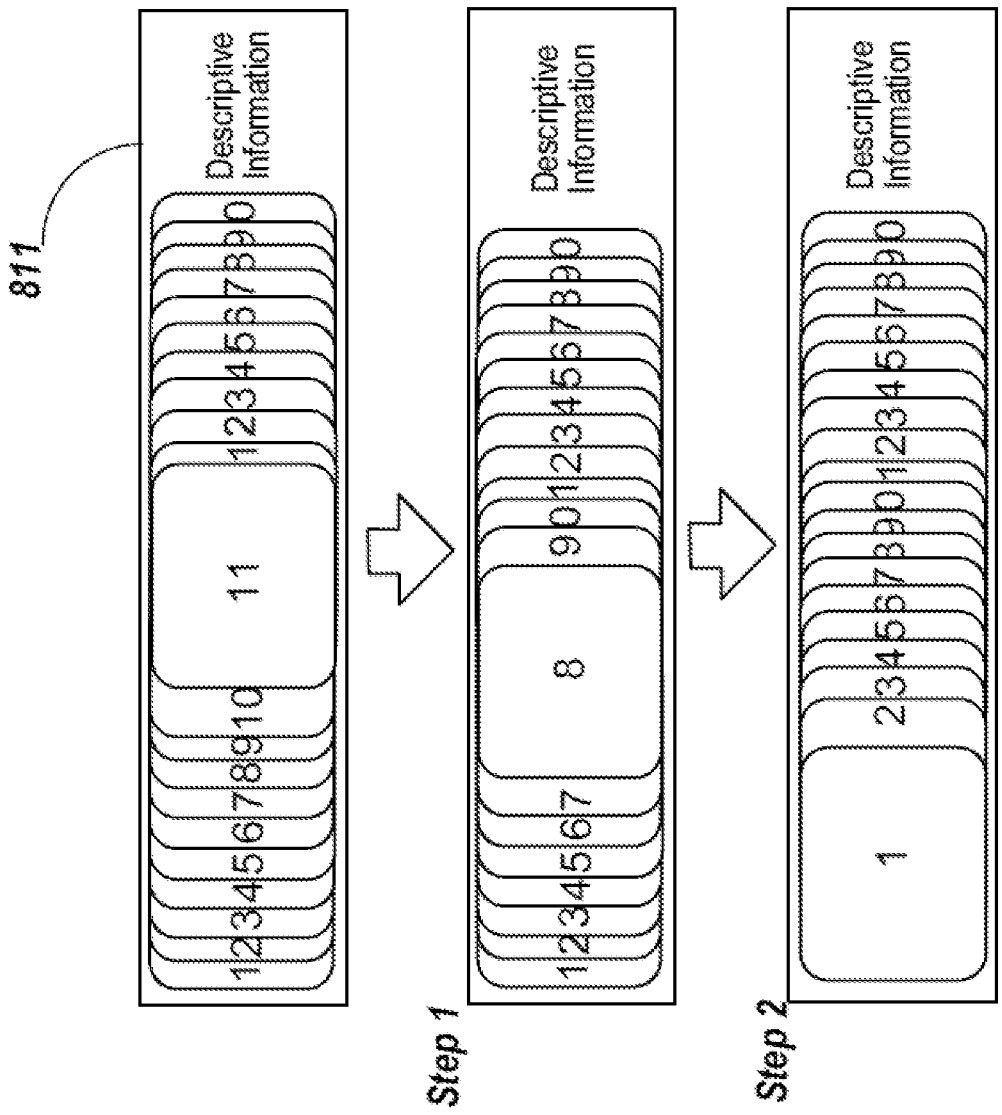
FIG. 8 illustrates another example of the environment on a user device for displaying the blockchain coupons dynamically for a user to traverse the blockchain coupons.

FIG. 8 illustrates another example of the environment on a user device for displaying the blockchain coupons dynamically for a user to traverse the blockchain coupons. As illustrated, the number of blockchain coupons in row 811 is relatively large (e.g., more than those in FIG. 7). Moreover, row 811 appears more packed, especially towards the left and right sides. As a result, a clicking operation may not zero in on the desired blockchain coupon. A clicking operation to the left of the currently active coupon may cause the coupon on the left to be fully displayed. As illustrated in FIG. 8 under step 1, three clicking operations leftward cause coupon 8 to be fully displayed. Under step 2, another seven clicks to the left cause coupon 1 to be displayed. Similarly, a clicking operation to the right may cause the coupon on the right to be fully displayed. A sliding operation may likewise drive the coupon display. In this example, the descriptive information on the right hand side may be placed on the left hand side. Row 811 may be without descriptive information.

Figure 9:
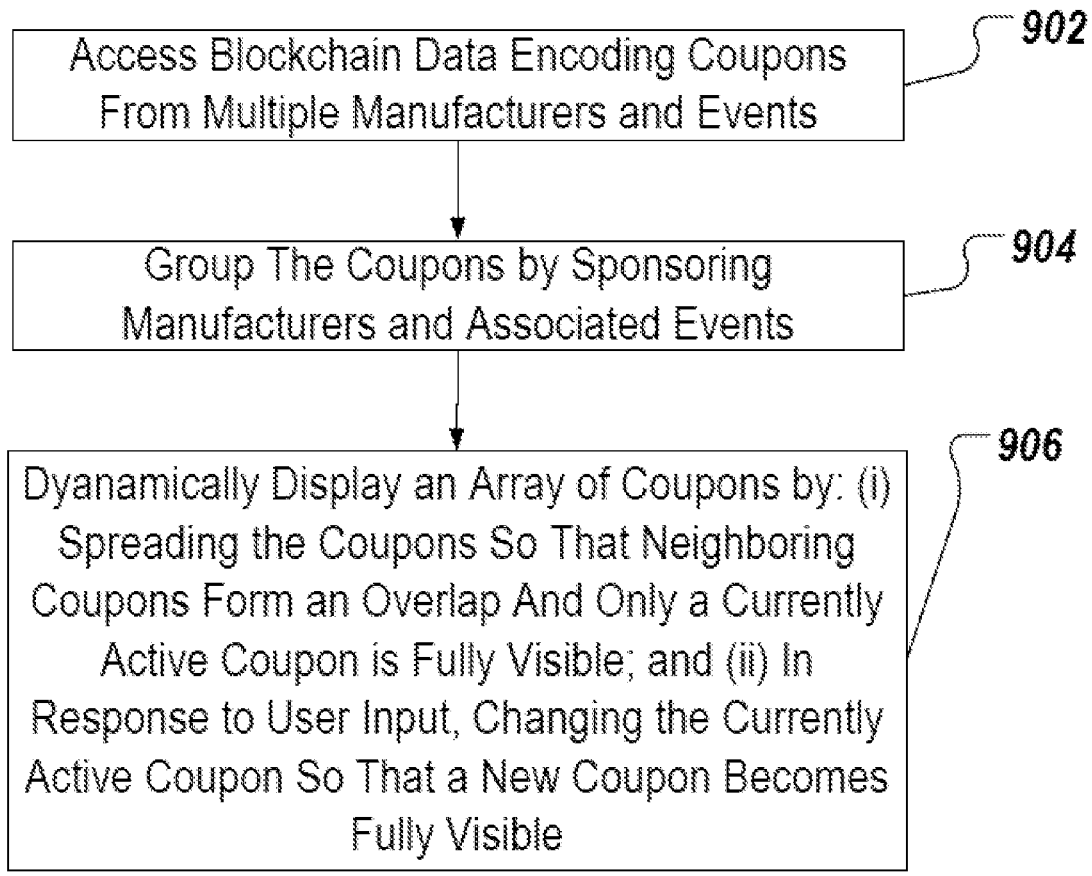
FIG. 9 depicts an example of a process that can be executed in accordance with embodiments of this specification.

FIG. 9 depicts an example of a process 900 that can be executed in accordance with embodiments of this specification. Initially, the process 900 may start with accessing blockchain data encoding coupons (902). Here, each coupon is sponsored by a manufacturer (for example, a brand name manufacturer) and associated with an event organized by the brand name manufacturer. The blockchain data may be initiated by the brand name manufacturer for the associated event. The process 900 may then proceed to grouping the coupons by sponsoring brand name manufacturers and associating events to generate arrays of matching coupons for each brand name manufacturer and each associating event (904). The arrays may be represented as multiple rows of blockchain coupons, as illustrated in FIG. 3. The process 900 may then proceed with dynamically displaying, on the display device, an array of coupons associated with a particular event organized by a particular brand name manufacturer (906). The dynamic display includes: spreading the coupons of the array from a first end to a second end on the display device such that each pair of neighboring coupons form an overlap and each coupon, other than a currently active coupon, is partially visible; and in response to a user input on the display device, changing the currently active coupon such that a new coupon becomes fully visible while other coupons are partially visible by virtue of the overlap formed by each pair of neighboring coupons. FIGS. 4A-B, 5A-B, 6A-B, 7, and 8 illustrate various aspects of the dynamic display. The dynamic display facilitates a small business owner (e.g., a grocery store owner) to view and redeem each types of coupons in a more user friendly way. When the small business owner chooses to redeem a particular blockchain coupon, data encoding the particular blockchain coupon is submitted (from various participants) to the consensus nodes of FIG. 2.

Figure 10:
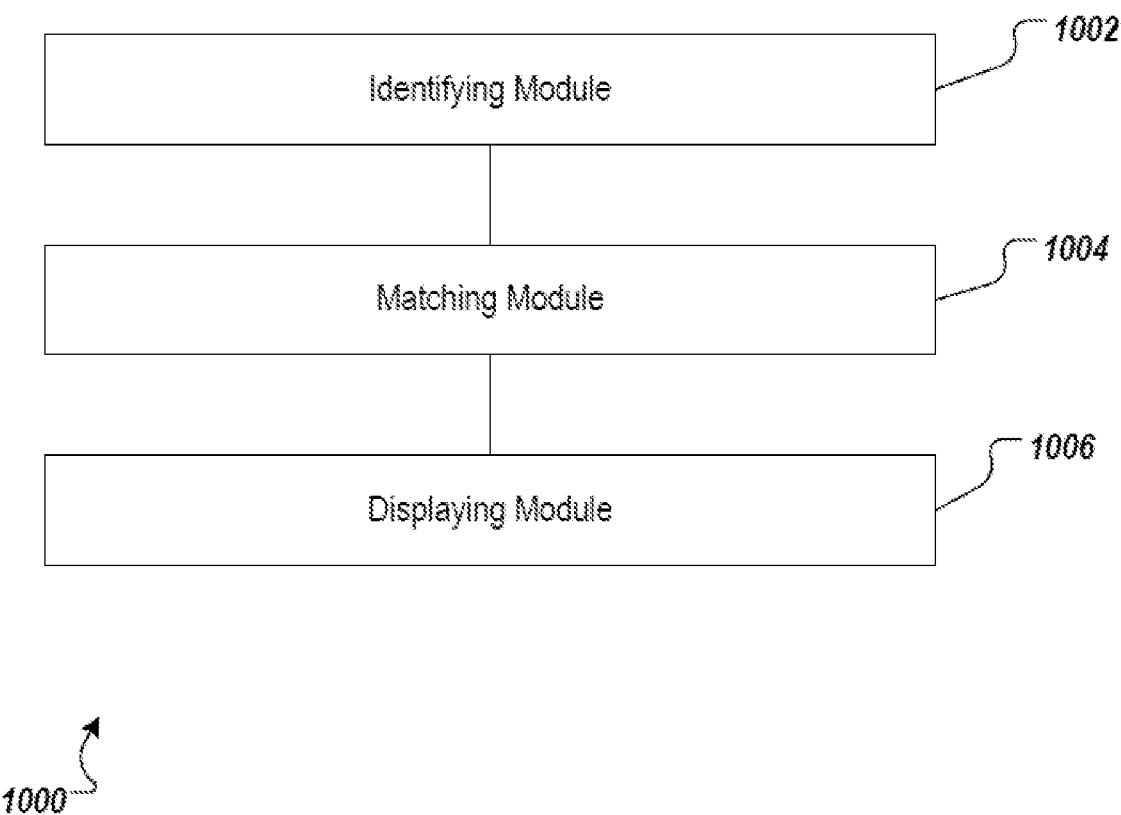
FIG. 10 depicts examples of modules of an apparatus in accordance with embodiments of this specification.

FIG. 10 depicts examples of modules of an apparatus 1000 in accordance with embodiments of this specification. The apparatus 1000 may include a user computing device for presenting coupons to a user on a user interface. The apparatus 1000 can correspond to the embodiments described above, and the apparatus 1000 includes the following: an identifying module 1002 that identifies data encoding coupons, a matching module 1004 that matches the coupons with each sponsoring manufacturer and each associated event, and a displaying module 1006 that dynamically displays an array of coupons associated with a particular event organized by a particular sponsoring manufacturer. The displaying module 1006 arranges the coupons of the array from a first end to a second end on the user interface such that each pair of neighboring coupons form an overlap and each coupon, other than a currently active coupon, is partially visible; and in response to a user input on the user interface, changing the currently active coupon such that a new coupon becomes the currently active coupon while other coupons are partially visible by virtue of the overlap formed by each pair of neighboring coupons.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

The techniques described in this specification produce one or more technical effects. In particular, these techniques improve the user interface so that a user, for example, an owner of a grocery store, can easily navigate a large collection of coupons (or vouchers, cards) associated with, for example, promotional events organized by manufacturers. In some embodiments, the configurations allow for individual operations on coupons of a specified denomination. In some embodiments, the configurations allow the user to perform batch operations on coupons according to a given dimension of a particular event. In some embodiments, the examples allow the user to operate on all events globally. In some embodiments, the configurations incorporate eye tracking devices to follow a user's eyeball motion so that user input is captured to drive the dynamic display of the coupons.

In more detail, these coupons may be arranged in a multidimensional manner on the user interface. The coupons may additionally be packed to achieve an overlap between neighboring pairs. In this manner, only a currently active coupon is full visible while all others coupons is only partially visible. Thus, more coupons may be packed in a more space efficient manner. In response to user inputs, the user interface may adjust the coupons on the display so that the currently active coupon remains on track with the user's expectation during the review process. The user may easily traverse, track, and redeem the coupons associated with a promotional event organized by a particular manufacturer. Compared with traditional process that is cumbersome and complicated, and the improved user interface leads to a much better user experience.

Described embodiments of the subject matter can include one or more features, alone or in combination.

For example, in a first embodiment, a computer-assisted method the method comprises: accessing blockchain data encoding coupons, each coupon sponsored by a brand name manufacturer and associated with an event organized by the brand name manufacturer; grouping the coupons by sponsoring brand name manufacturers and associating events to generate arrays of matching coupons for each brand name manufacturer and each associating event; and dynamically displaying, on the display device, an array of coupons associated with a particular event organized by a particular brand name manufacturer by: spreading the coupons of the array from a first end to a second end on the display device such that each pair of neighboring coupons form an overlap and each coupon, other than a currently active coupon, is partially visible; and in response to a user input on the display device, changing the currently active coupon such that a new coupon becomes fully visible while other coupons are partially visible by virtue of the overlap formed by each pair of neighboring coupons.

The foregoing and other described embodiments can each, optionally, include one or more of the following features:

A first feature, combinable with any of the following features, specifies that dynamically displaying further comprises packing coupons with an identical attribute as one unit of the array when the coupons of the array are spread from the first end to the second end on the display device, and wherein the identical attribute comprises one of: a monetary value, an Internet Protocol address, an expiration date, or an initial offer date.

A second feature, combinable with any of the previous or following features, specifies that spreading the coupons comprises spreading a partial subset of the coupons of the array on the display device between the first end and the second end such that, when the currently active coupon is changed in response to the user input, the partial subset is automatically updated to a different partial subset.

A third feature, combinable with any of the previous or following features, specifies that the array is arranged as a circular array and that when the currently active coupon is changed in response to the user input, the new coupon is positioned at where the currently active coupon used to be.

A fourth feature, combinable with any of the previous or following features, specifies that the array is arranged as a linear array and that changing the currently active coupon comprises: rendering the new coupon fully visible until either the first end or the second end meets a boundary of the linear array by virtue of the user input on the display device.

A fifth feature, combinable with any of the previous or following features, specifies that each array of the matching coupons are generated in a sequential order, that the partial subset is a subset of consecutive coupons from a corresponding array of matching coupons, and that the sequential order sets forth one of: an order of monetary value, an order an expiration date, or an order of an initial offer date.

A sixth feature, combinable with any of the previous or following features, specifies that the user input indicates a location on the display device, and that changing the currently active coupon comprises: in response to the location being between the currently active coupon and the first end on the display device, choosing the new coupon as between the first end on the display device and the currently active coupon; and in response to the location being between the currently active coupon and the second end on the display device, choosing the new coupon as between the currently active coupon and the second end on the display device.

A seventh feature, combinable with any of the previous or following features, specifies that the user input indicates a location on the display device, and that changing the currently active coupon comprises: in response to the location being between the currently active coupon and the first end on the display device, choosing the new coupon to be one coupon closer to the first end on the display device than the currently active coupon; and in response to the location being between the currently active coupon and the second end on the display device, choosing the new coupon to be one coupon closer to the second end on the display device than the currently active coupon.

A eighth feature, combinable with any of the previous or following features, specifies that the user input comprises one of: a click, a tap, a slide, a page up, a page down, a space, a tab, or an eye-gaze motion of the user.

A ninth feature, combinable with any of the previous or following features, the method further comprises: in response to a user selecting a particular coupon, transmitting the blockchain data encoding the particular coupon to a distributor of the brand name manufacturer for redemption.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for presenting coupons in a user interface, the method comprising:
    identifying data stored in a blockchain network for encoding a plurality of coupons, each coupon of the plurality of coupons associated with a sponsoring manufacturer and associated with an event organized by the sponsoring manufacturer;
    matching the plurality of coupons with each sponsoring manufacturer and each associated event;
    dynamically displaying, on the user interface, an array of coupons associated with a particular event organized by a particular sponsoring manufacturer, and an event card containing descriptive summary information about the coupons of the array, wherein the event card comprises information associated with at least one of a total value of the coupons of the array or a total number of the coupons of the array, and wherein dynamically displaying comprises:
        arranging the coupons of the array from a first end to a second end on the user interface such that each pair of neighboring coupons form an overlap and each coupon, other than a currently active coupon having a currently active state on the user interface, is partially visible, and
        arranging the event card such that the event card overlaps with a neighboring coupon in the array of the coupons, wherein the event card is at one of the first end or the second end of the array;
    in response to a user input on the user interface with the currently active coupon having the currently active state, changing the currently active coupon such that a new coupon or the event card has the currently active state and is fully visible while other coupons are partially visible by virtue of the overlap formed by each pair of neighboring coupons;
    in response to a user input on the user interface with the event card having the currently active state, changing the event card such that a new coupon has the currently active state and is fully visible while other coupons are partially visible by virtue of the overlap formed by each pair of neighboring coupons; and
    in response to the new coupon having the currently active state, setting the new coupon as the currently active coupon.

2. The method of claim 1, wherein dynamically displaying further comprises packing coupons with an identical attribute as one unit of the array when the coupons of the array are arranged from the first end to the second end on the user interface, and wherein the identical attribute comprises at least one of: a monetary value, an Internet Protocol address, an expiration date, or an initial offer date.

3. The method of claim 1, wherein arranging the coupons comprises arranging a partial subset of the coupons of the array on the user interface between the first end and the second end, and wherein, when the currently active coupon is changed in response to the user input, the partial subset is automatically updated to a different partial subset.

4. The method of claim 1, wherein the array is a linear array.

5. The method of claim 4, wherein changing the currently active coupon comprises: rendering the new coupon fully visible until either the first end or the second end meets a boundary of the linear array based on the user input on the user interface.

6. The method of claim 3, wherein the array of the coupons is generated in a sequential order, and wherein the partial subset is a subset of consecutive coupons from the array of the coupons.

7. The method of claim 6, wherein the sequential order sets forth at least one of: an order of monetary value, an order of an expiration date, or an order of an initial offer date.

8. The method of claim 1, wherein the user input indicates a location on a display device, and wherein changing the currently active coupon comprises:
    in response to the location being between the currently active coupon and the first end on the user interface, choosing the new coupon as between the first end on the user interface and the currently active coupon; and
    in response to the location being between the currently active coupon and the second end on the user interface, choosing the new coupon as between the currently active coupon and the second end on the user interface.

9. The method of claim 1, wherein the user input indicates a location on the user interface, and wherein changing the currently active coupon comprises:
    in response to the location being between the currently active coupon and the first end on the user interface, choosing the new coupon to be one coupon closer to the first end on the user interface than the currently active coupon; and
    in response to the location being between the currently active coupon and the second end on the user interface, choosing the new coupon to be one coupon closer to the second end on the user interface than the currently active coupon.

10. The method of claim 1, wherein the user input comprises at least one of: a click, a tap, a slide, a page up, a page down, a space, a tab, or an eye-gaze motion of a user.

11. The method of claim 1, further comprising: in response to a user selecting a particular coupon, transmitting the data encoding the particular coupon to a distributor of the corresponding manufacturer for redemption such that the particular coupon is traced to the corresponding manufacturer.

12. A non-transitory, computer-readable storage medium storing one or more instructions executable by a computer system to perform operations for presenting coupons in a user interface, the operations comprising:
   identifying data stored in a blockchain network for encoding a plurality of coupons, each coupon of the plurality of coupons associated with a sponsoring manufacturer and associated with an event organized by the sponsoring manufacturer;
   matching the plurality of coupons with each sponsoring manufacturer and each associated event;
   dynamically displaying, on the user interface, an array of coupons associated with a particular event organized by a particular sponsoring manufacturer, and an event card containing descriptive summary information about the coupons of the array, wherein the event card comprises information associated with at least one of a total value of the coupons of the array or a total number of the coupons of the array, and wherein dynamically displaying comprises:
      arranging the coupons of the array from a first end to a second end on the user interface such that each pair of neighboring coupons form an overlap and each coupon, other than a currently active coupon having a currently active state on the user interface, is partially visible, and
      arranging the event card such that the event card overlaps with a neighboring coupon in the array of the coupons, wherein the event card is at one of the first end or the second end of the array;
   in response to a user input on the user interface with the currently active coupon having the currently active state, changing the currently active coupon such that a new coupon or the event card has the currently active state and is fully visible while other coupons are partially visible by virtue of the overlap formed by each pair of neighboring coupons;
   in response to a user input on the user interface with the event card having the currently active state, changing the event card such that a new coupon has the currently active state and is fully visible while other coupons are partially visible by virtue of the overlap formed by each pair of neighboring coupons; and
   in response to the new coupon having the currently active state, setting the new coupon as the currently active coupon.

13. The non-transitory, computer-readable storage medium of claim 12, wherein dynamically displaying further comprises packing coupons with an identical attribute as one unit of the array when the coupons of the array are arranged from the first end to the second end on the user interface, and wherein the identical attribute comprises at least one of: a monetary value, an Internet Protocol address, an expiration date, or an initial offer date.

14. The non-transitory, computer-readable storage medium of claim 12, wherein arranging the coupons comprises arranging a partial subset of the coupons of the array on the user interface between the first end and the second end, and wherein, when the currently active coupon is changed in response to the user input, the partial subset is automatically updated to a different partial subset.

15. The non-transitory, computer-readable storage medium of claim 12, wherein the array is a linear array, and changing the currently active coupon comprises: rendering the new coupon fully visible until either the first end or the second end meets a boundary of the linear array based on the user input on the user interface.

16. The non-transitory, computer-readable storage medium of claim 14, wherein the array of the coupons is generated in a sequential order, and wherein the partial subset is a subset of consecutive coupons from the array of the coupons.

17. The non-transitory, computer-readable storage medium of claim 16, wherein the sequential order sets forth at least one of: an order of monetary value, an order of expiration date, or an order of initial offer date.

18. The non-transitory, computer-readable storage medium of claim 12, wherein the user input indicates a location on a display device, and wherein changing the currently active coupon comprises:
   in response to the location being between the currently active coupon and the first end on the user interface, choosing the new coupon as between the first end on the user interface and the currently active coupon; and
   in response to the location being between the currently active coupon and the second end on the user interface, choosing the new coupon as between the currently active coupon and the second end on the user interface.

19. The non-transitory, computer-readable storage medium of claim 12, wherein the user input indicates a location on the user interface, and wherein changing the currently active coupon comprises: in response to the location being between the currently active coupon and the first end on the user interface, choosing the new coupon to be one coupon closer to the first end on the user interface than the currently active coupon; and in response to the location being between the currently active coupon and the second end on the user interface, choosing the new coupon to be one coupon closer to the second end on the user interface than the currently active coupon.

20. The non-transitory, computer-readable storage medium of claim 12, wherein the user input comprises at least one of: a click, a tap, a slide, a page up, a page down, a space, a tab, or an eye-gaze motion of a user.

21. The non-transitory, computer-readable storage medium of claim 12, the operations further comprising: in response to a user selecting a particular coupon, transmitting the data encoding the particular coupon to a distributor of the corresponding manufacturer for redemption such that the particular coupon is traced to the corresponding manufacturer.

22. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations for presenting coupons in a user interface, the operations comprising:

identifying data stored in a blockchain network for encoding a plurality of coupons, each coupon of the plurality of coupons associated with a sponsoring manufacturer and associated with an event organized by the sponsoring manufacturer;

matching the plurality of coupons with each sponsoring manufacturer and each associated event; and dynamically displaying, on the user interface, an array of coupons associated with a particular event organized by a particular sponsoring manufacturer, and an event card containing descriptive summary information about the coupons of the array, wherein the event card comprises information associated with at least one of a total value of the coupons of the array or a total number of the coupons of the array, and wherein dynamically displaying comprises:

arranging the coupons of the array from a first end to a second end on the user interface such that each pair of neighboring coupons form an overlap and each coupon, other than a currently active coupon having a currently active state on the user interface, is partially visible, and arranging the event card such that the event card overlaps with a neighboring coupon in the array of the coupons, wherein the event card is at one of the first end or the second end of the array;

in response to a user input on the user interface with the currently active coupon having the currently active state, changing the currently active coupon such that a new coupon or the event card has the currently active state and is fully visible while other coupons are partially visible by virtue of the overlap formed by each pair of neighboring coupons;

in response to a user input on the user interface with the event card having the currently active state, changing the event card such that a new coupon has the currently active state and is fully visible while other coupons are partially visible by virtue of the overlap formed by each pair of neighboring coupons; and in response to the new coupon having the currently active state, setting the new coupon as the currently active coupon.

23. The computer-implemented system of claim 22, wherein dynamically displaying further comprises packing coupons with an identical attribute as one unit of the array when the coupons of the array are arranged from the first end to the second end on the user interface, and wherein the identical attribute comprises at least one of: a monetary value, an Internet Protocol address, an expiration date, or an initial offer date.

24. The computer-implemented system of claim 22, wherein the array is a linear array, and changing the currently active coupon comprises: rendering the new coupon fully visible until either the first end or the second end meets a boundary of the linear array based on the user input on the user interface.

25. The computer-implemented system of claim 22, wherein the user input indicates a location on a display device, and wherein changing the currently active coupon comprises:

in response to the location being between the currently active coupon and the first end on the user interface, choosing the new coupon as between the first end on the user interface and the currently active coupon; and in response to the location being between the currently active coupon and the second end on the user interface, choosing the new coupon as between the currently active coupon and the second end on the user interface.

26. The computer-implemented system of claim 22, wherein the user input indicates a location on the user interface, and wherein changing the currently active coupon comprises:

in response to the location being between the currently active coupon and the first end on the user interface, choosing the new coupon to be one coupon closer to the first end on the user interface than the currently active coupon; and in response to the location being between the currently active coupon and the second end on the user interface, choosing the new coupon to be one coupon closer to the second end on the user interface than the currently active coupon.

\* \* \* \* \*